J. G. WRIGHT.
ADJUSTABLE FLAT DIE.
APPLICATION FILED SEPT. 18, 1918.
1,377,954. Patented May 10, 1921.
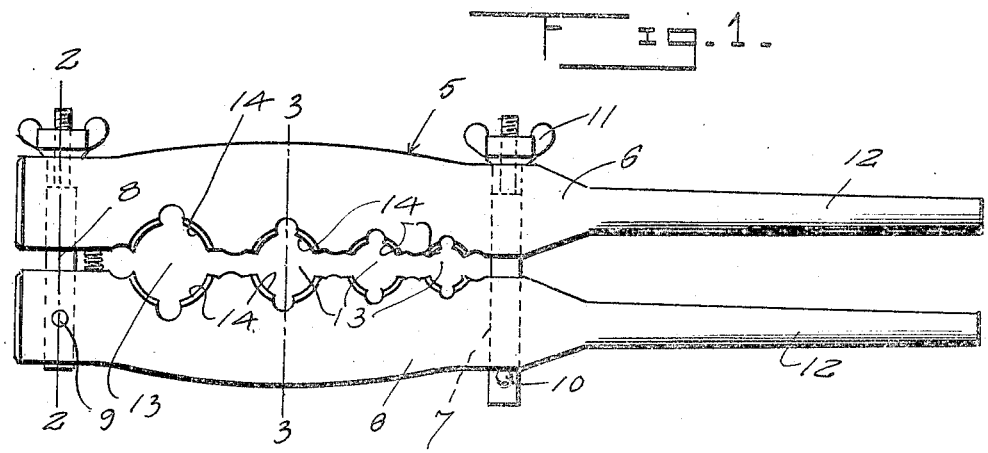
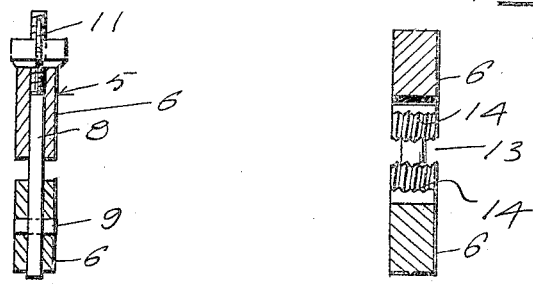
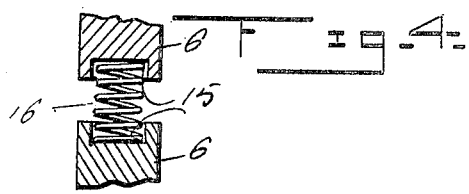
Inventor
J.G.Wright
By
Attorney

UNITED STATES PATENT OFFICE.

JOHN G. WRIGHT, OF TYLER, TEXAS.

ADJUSTABLE FLAT DIE.

1,377,954.  Specification of Letters Patent.  Patented May 10, 1921.

Application filed September 18, 1918. Serial No. 254,627.

*To all whom it may concern:*

Be it known that I, JOHN G. WRIGHT, a subject of Great Britain, residing at Tyler, in the county of Smith and State of Texas, have invented certain new and useful Improvements in Adjustable Flat Dies; and I do hereby declare the following to be a full, clear, and exact description of the invention, such as will enable others skilled in the art to which it appertains to make and use the same.

My invention relates to improvements in thread cutters and has particular reference to a device of this character especially adapted for cutting threads in pipes and bolts.

An important object of this invention is to provide a thread cutting device, provided with a plurality of different sized cutting dies.

A further object of the invention is to provide a thread cutting device especially adapted for threading pipes and the like, and having means for cutting a thread of any desired depth in the pipe, thus permitting of a series of light cuts to be described in a pipe in lieu of one deep cut.

A further object of the invention is to provide a device for cutting threads in different sized pipes and bolts, which is simple to use, of highly simplified construction, durable in wear and cheap to manufacture.

Other objects and advantages of the invention will be apparent during the course of the following description.

In the accompanying drawings forming a part of this specification and in which like numerals are employed to designate like parts throughout the same, Figure 1 is a side elevation of a thread cutting device embodying my invention, Fig. 2 is a transverse vertical section taken on line 2—2 of Fig. 1, Fig. 3 is a transverse vertical section taken on line 3—3 of Fig. 1, and, Fig. 4 is an enlarged detail sectional view through a portion of the device, showing means for retaining the several jaws in spaced relation to each other.

In the drawings, wherein for the purpose of illustration is shown the preferred embodiment of my invention, the numeral 5 generically designates the device, which in manufacture may be made of a good quality tool steel. A pair of oppositely arranged jaws designated by the numeral 6 are provided with alining openings 7 adapted for the reception of bolts or pins 8. The forward pin 8 extending through the alining opening 7 is provided with a transversely extending rivet 9, which serves to effect a rigid engagement between the bolt 8 and lower jaw 6. The rear bolt 8 is provided at a point below the lower jaw 6 with a transversely extending pin 10. The upper end portions of the bolts 8 are screw threaded and are adapted to partake of engagement with winged nuts 11. Handles 12 are formed on the rear end portions of the jaws 6.

The inner faces of the jaws 6 are provided with semi-circular recesses 13 having cutting threads 14. As clearly shown in Fig. 1, each of the pairs of recesses 13 vary in size, thus permitting of the use of the device in cutting threads of different sizes. As clearly shown in Fig. 4, oppositely disposed circular recesses are provided in the inner surfaces of the jaws 6 and are designated by the numeral 15. These recesses are adapted for the reception of the opposite end portions of a coiled spring 16 which serves to space the jaws 6. With reference to the drawings, it will be apparent that should it be desired to thread a relatively heavy pipe the same may be inserted within the proper die. By adjusting the die to cut a very light thread, it will be apparent that but little effort will be required to rotate the device to effect this cut. By a series of such cuts, each cut being deeper than the preceeding one, it will be obvious that the pipe may be threaded with a lesser expenditure of effort than would be required to thread the pipe with one deep cut.

While I have shown and described the preferred embodiment of my invention, it is understood that I may make such minor changes in arrangement and construction of parts, as will remain within the spirit of the invention and the scope of the appended claim.

Having thus described my invention, what I claim is:

A die, a pair of coacting jaws, thread cutting elements carried by the opposed faces of the jaws, a handle extending from one end of each jaw, said handles extending in the same direction, bolts passing through the jaws adjacent the ends thereof, a pin extending transversely of the bolt and one of the jaws, a pin carried by one end of the remaining bolt, bearing against the outer edge of the jaw and serving to limit the movement of said jaw away from the opposite jaw and permitting movement toward said opposite jaw.

In testimony whereof I affix my signature in presence of two witnesses.

JOHN G. WRIGHT.

Witnesses:
E. D. HALL,
W. C. McNELLY.